(12) United States Patent
Natori (10) Patent No.: US 7,933,449 B2
(45) Date of Patent: Apr. 26, 2011

(54) PATTERN RECOGNITION METHOD (75) Inventor: Naotake Natori, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1035 days.

(21) Appl. No.: 11/723,840

(22) Filed: Mar. 22, 2007

(65) Prior Publication Data

US 2007/0223821 A1 Sep. 27, 2007

(30) Foreign Application Priority Data

Mar. 23, 2006 (JP) ................. 2006-080837

(51) Int. Cl.
*G06K 9/00* (2006.01)
*G06K 9/62* (2006.01)

(52) U.S. Cl. ................ 382/181; 382/224
(58) Field of Classification Search .......... 382/181, 382/224, 242
See application file for complete search history.

(56) References Cited

U.S. PATENT DOCUMENTS

| | | | | |
|---|---|---|---|---|
| 2004/0010400 | A1* | 1/2004 | Canning | 703/2 |
| 2005/0242807 | A1 | 11/2005 | Freedman | |

FOREIGN PATENT DOCUMENTS

| | | |
|---|---|---|
| DE | 10 2004 030 782 A1 | 1/2006 |
| JP | 02-019992 | 1/1990 |

OTHER PUBLICATIONS

Cao et al., The application of DBF neural networks for object recognition, elsevier inc, information sciences, 2004, pp. 153-160.*
European Search Report dated Mar. 16, 2009 for Appln. No. 07005032.3-2218.
Saavedra, Ernesto et al. "Gaussians-Based Hybrid System for Predication and Classification"; Springer-Verlag Berlin Heidelberg 2001; pp. 492-499; 2001; XP007907405.
European Search Report dated Jul. 20, 2007 for Appln. No. 07005032.3-2218.
Xu L et al. "On Radial Basis Function Nets and Kernel Regression: Statistical Consistency, Convergence Rates, and Receptive Field Size"; Neural Networks, Elsevier Science Publishers, Barking; GB, vol. 7, No. 4, Jan. 1994; pp. 609-628, XP000445901; ISSN : 0893-6080.
Shibayama H et al. "Prediction of Chaos and Bifurcation: An Asymmetric Basis Function Approach"; Neural Networks,1997., International Conference on Houston, TX, USA Jun. 9-12, 1997; New York, NY, USA, IEEE, US, vol. 4, Jun. 9, 1997, pp. 2251-2256, XP010238992 ISBN: 0-7803-4122-8.
Musavi M T Ed—Institute of Electrical and Electronics Engineers: "Receptive Field Estimation for Gaussian-Based Neural Networks"; Proceedings of the International Conference on Neural Networks ( ICNN) . San Francisco, Mar. 28—Apr. 1, 1993, New York, IEEE, US, vol. 1, Mar. 28, 1993, pp. 1343-1347, XP010111648; ISBN: 0-7803-0999-5.

(Continued)

*Primary Examiner* — John B Strege
(74) *Attorney, Agent, or Firm* — Pillsbury Winthrop Shaw Pittman, LLP (57) ABSTRACT

According to one embodiment of the present invention, there is provided a pattern recognition method of approximating distribution of a set of vectors and a class boundary in a vector space based on basis functions. The method includes defining directional basis functions between two basis vectors, and performing the approximation using a linear combination of the directional basis functions.

4 Claims, 6 Drawing Sheets

OTHER PUBLICATIONS

Nevatia, Ramakant; "Machine Perception"; Departments of Electrical Engineering and Computer Science University of Southern California; Englewood Cliffs, New Jersey; 1982; pp. 12-23.

European Search Report dated Jan. 31, 2011.

Martin D. Buhmann "Radial Basis Functions"; Cambridge Monographs on Applied and Computational Mathematics; 2003; pp. ix, and 5-8.

* cited by examiner

PATTERN RECOGNITION METHOD

CROSS-REFERENCE TO RELATED APPLICATIONS

This application is based upon and claims the benefit of priority from prior Japanese Patent Application No. 2006-080837, filed Mar. 23, 2006, the entire contents of which are incorporated herein by reference.

BACKGROUND OF THE INVENTION

1. Field of the Invention

The present invention relates to a pattern recognition method adapted to approximate the distribution of a set of vectors and the boundary of two or more sets (classes) of vectors in a vector space based on basis functions.

2. Description of the Related Art

Methods of using basis functions referred to as radial basis functions (to be referred to as spherical basis functions hereinafter) are known. Spherical basis functions have been proposed by several study groups independently. J. E. Moody and C. Darken: "Fast Learning in Networks of Locally-Tuned Processing Units", Neural Computation 1, pp. 281-294, 1989, may be cited here as an example of such propositions. Spherical basis functions have a peak at the center and symmetrical in all directions. Of spherical basis functions, those of the so-called Gaussian type are the most popular and are expressed by $$o_i(x) = \exp[-\|x - \xi_i\|^2 / 2\sigma_i^2]$$

where x is the vector that corresponds to the input pattern and $\xi_i$ is the i-th basis vector (parameter indicating the position in the Gaussian distribution) while $\sigma_i$ is the i-th standard deviation (parameter indicating the expanse of the Gaussian distribution). The value of the i-th Gaussian type basis function is $o_i(x)$, which is not negative and large when x is close to $\xi_i$ and takes the largest value of 1 when $x=\xi_i$. It is possible to approximate the distribution of any arbitrarily selected set of vectors to a desired accuracy level by providing a sufficient number of basis functions and using a weighted linear combination as expressed by $$y_l(x) = \sum_{i=1}^{H'} w_{li} o_i(x)$$

where l is the class number of the set of vector and $w_{li}$ is the contribution ratio (weight parameter) of the i-th basis function to the class l, while H' is the number of basis functions. The above formula indicates the extent to which an unknown input pattern resembles the particular class (degree of similarity) so that it can be used to classify classes. For example, if $$C(x) = \arg\max_l [y_l(x)]$$

it is possible to determine the class of an input pattern according to the class boundary defined by basis functions. In the formula 3 above, $\arg\max_l [\cdot]$ is the number of the class that provides the largest value for the degree of similarity.

The pattern recognition method that uses spherical basis functions provides advantages including the ability to optimize parameters by learning, like feedforward neural nets based on general sigmoid functions; but, unlike general neural nets, the contribution ratios of individual basis functions are intuitively comprehensible.

However, the distribution of vectors that corresponds to a pattern observed from the real world is, more often than not, complex and hence it is necessary to prepare a large number of basis functions in order to accurately approximate such a distribution. Conversely, when the number of obtained samples is small, approximation can produce a state of being too complex relative to the proper distribution (population distribution) (excessive learning).

BRIEF SUMMARY OF THE INVENTION

Accordingly, it is an object of the present invention to provide a pattern recognition method adapted to approximate the distribution of a set of vectors that may be complex and the boundary of classes based on fewer basis vectors than the number of known comparable methods.

According to one embodiment of the present invention, there is provided a pattern recognition method of approximating distribution of a set of vectors and a class boundary in a vector space based on basis functions. The method includes defining directional basis functions between two basis vectors, and performing the approximation using a linear combination of the directional basis functions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

First Embodiment

Figure 1:
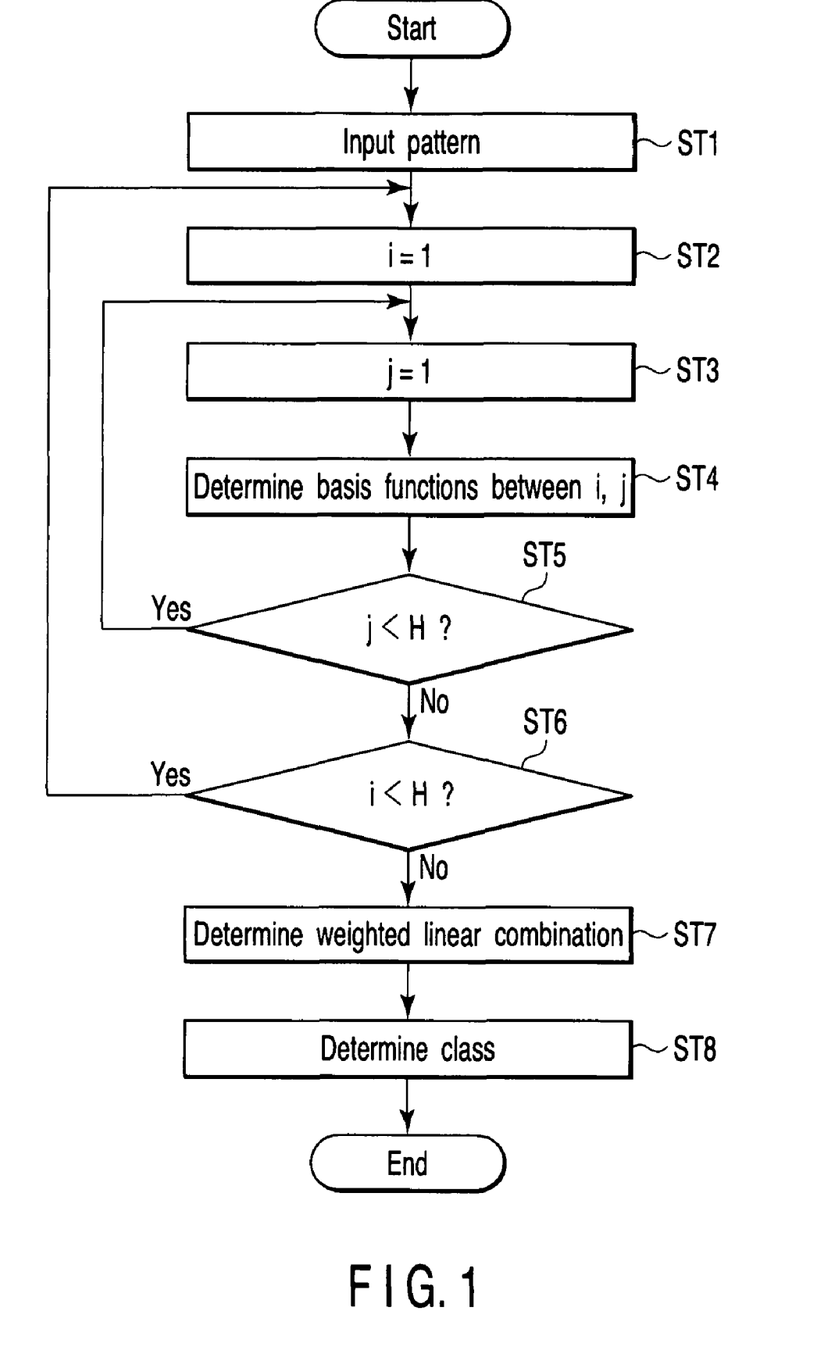
FIG. 1 is a flowchart of a processing operation of an embodiment of the present invention, shown as an example.
Figure 2:
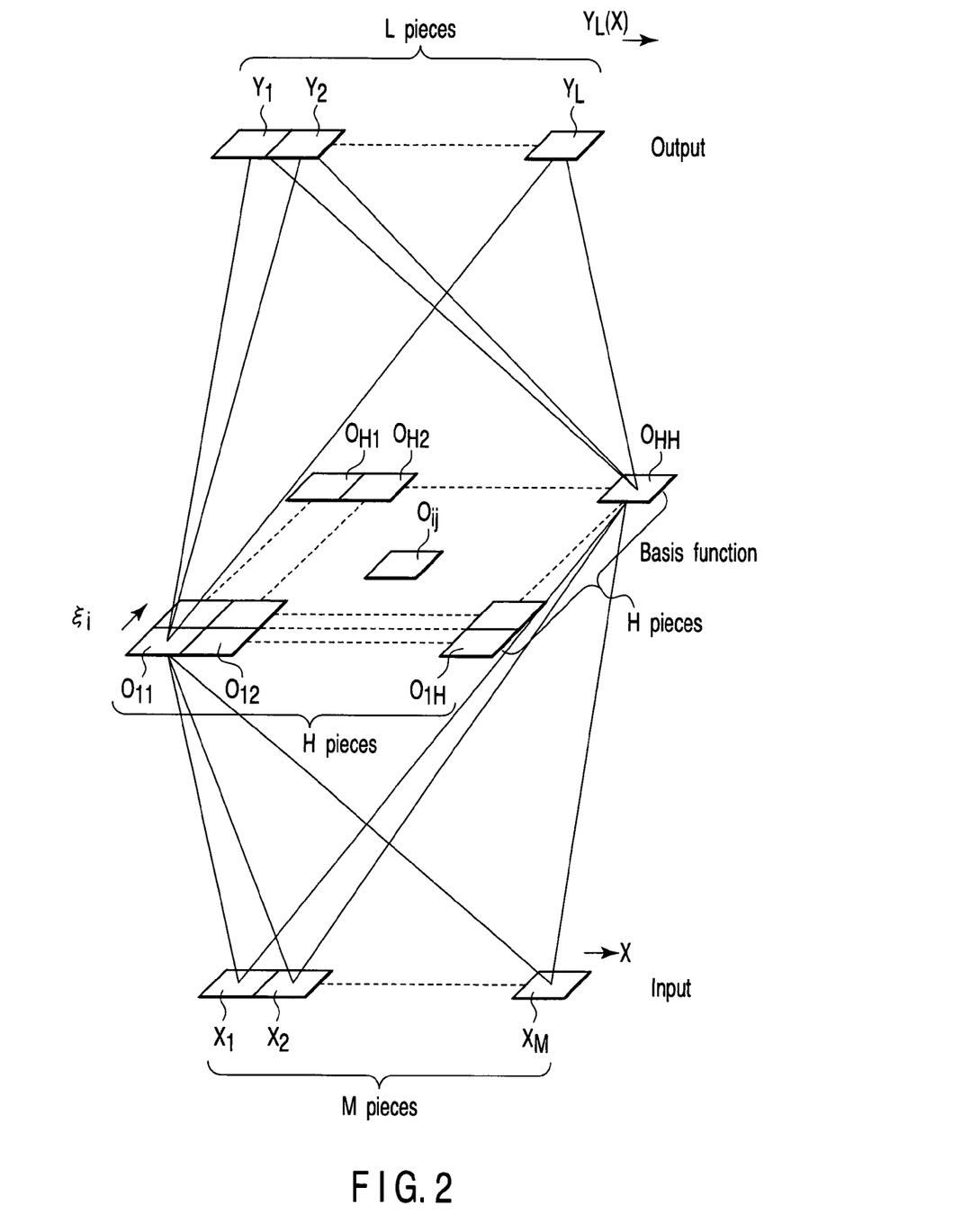
FIG. 2 is an illustration of the vectors, the basis functions and the distribution of the set of vectors that correspond to an input pattern, shown as an example.

FIG. 1 is a flowchart of a processing operation of this embodiment. FIG. 2 is an illustration of the vectors, the basis functions and the distribution of the set of vectors that correspond to an input pattern.

Firstly, a pattern is input (ST1). The expression of a pattern as used herein refers to a string of numerical values that a computer can handle such as the pixel values of a digital image or a row of characteristic quantities. A pattern can be regarded as vectors having such numerical values as components (ST2, ST3). The vectors that correspond to the input pattern are expressed by x in $$x=[x_1, x_2, \ldots, x_M]^T$$

where $x_1, x_2, \ldots, x_M$ represent the string of numerical value of the pattern (the elements of each vector) and M represents the number of elements.

Then, the values of the basis functions are computationally determined (ST4 through ST6). According to this embodiment, basis functions are defined between two basis vectors so that, if the number of basis vectors is H, the number of basis functions is $H^2$. This embodiment proposes basis functions $o_{ij}(x)$ expressed by a formula that has peaks at the positions of the two basis vectors and enhanced characteristics centered at the line segment connecting the two peaks. The formula is $$o_{ij}(x) = \exp[-\|x - \xi_i\|^2 \|x - \xi_j\|^2 / 2\sigma_{ij}^2]$$

where x represents the vectors that correspond to the input pattern and $\xi_i$ represents the i-th basis vector, while $\xi_j$ represents the j-th basis vector and $\sigma_{ij}$ represents the standard deviation of the basis functions defined between the i-th and j-th basis vectors.

Figure 3:
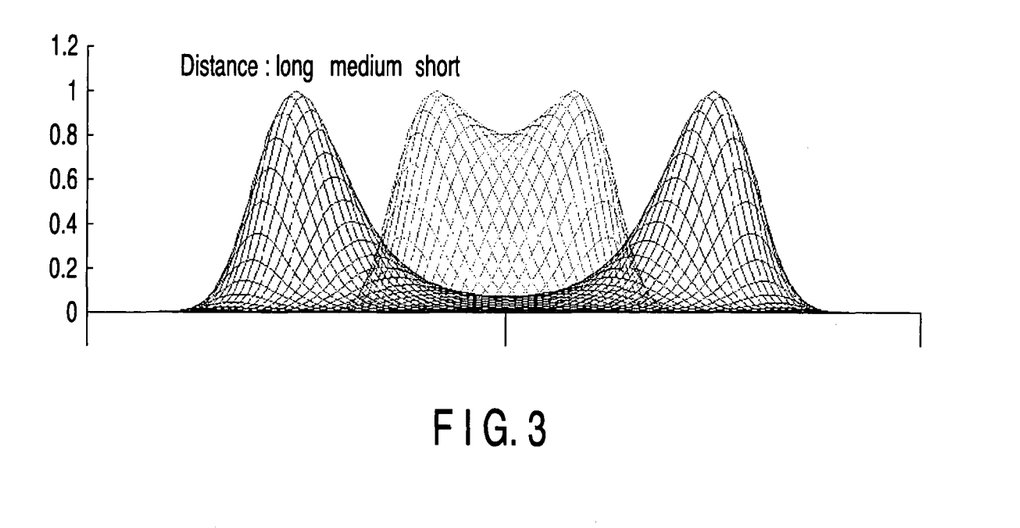
FIG. 3 is an illustration of basis functions, shown as an example.

The basis function essentially different from conventional spherical basis functions in that it is not symmetrical in all directions when the basis vector is viewed as center (and has enhanced characteristics depending on the direction of some other basis vector). FIG. 3 is an illustration of basis functions, shown as an example. The present invention is based on "an assumption of linear interpolation" or "an assumption that the linear interpolation between two basis vectors is strong when the distance between them is short". FIG. 3 shows the profiles of three different basis functions when the distance between the two vectors is long, medium and short.

Like a spherical basis function, the value of $o_{ij}(x)$ is non-negative and becomes larger as x approaches $\xi_i$ or $\xi_j$ so that it takes the largest value of 1 when $x=\xi_i$ or $x=\xi_j$. Additionally and similarly, the distribution $y_l(x)$ of the set of vectors can be approximated by a weighted linear combination (ST7, ST8) as expressed by the formula below.

$$y_l(x) = \sum_{i=1}^{H} \sum_{i=1}^{H} w_{lij} o_{ij}(x)$$

where l represents the class number of the set of vectors and $w_{lij}$ represents the contribution ratio of the class l of the basis functions defined between the i-th and j-th basis vectors, while H represents the number of basis function.

Finally, the extent to which the input pattern resembles the class (the degree of similarity), or C(x), is computationally determined by means of the formula shown below.

$$C(x) = \arg\max_l [y_l(x)]$$

where $\mathrm{argmax}_l [\cdot]$ is the number of the class that provides the largest value for the degree of similarity.

Figure 4:
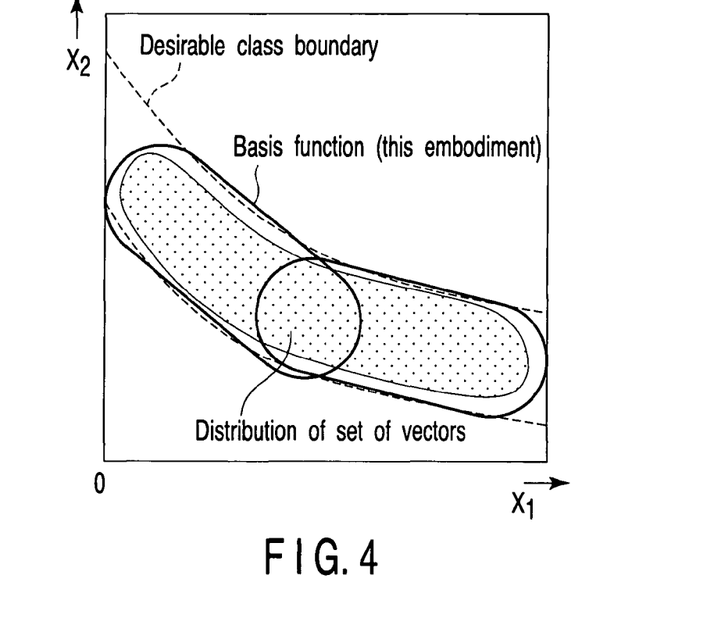
FIG. 4 is a schematic illustration of an approximation of a pattern distribution, shown as an example.

The basis function of this embodiment has the advantage that it is possible to learn parameters and the contribution ratios are intuitively comprehensible like conventional spherical basis functions and additionally overcomes the problems of the conventional methods. More specifically, a complex distribution of vectors can be approximated by fewer basis vectors than ever. FIG. 4 is a schematic illustration of an approximation of a pattern distribution by means of this embodiment. Since the basis function of this embodiment has a characteristic showing an elliptic or cylindrical expanse (asymmetric) as indicated by solid lines, it is highly expressive if compared with a conventional basis function that shows only a circular expanse.

Figure 5:
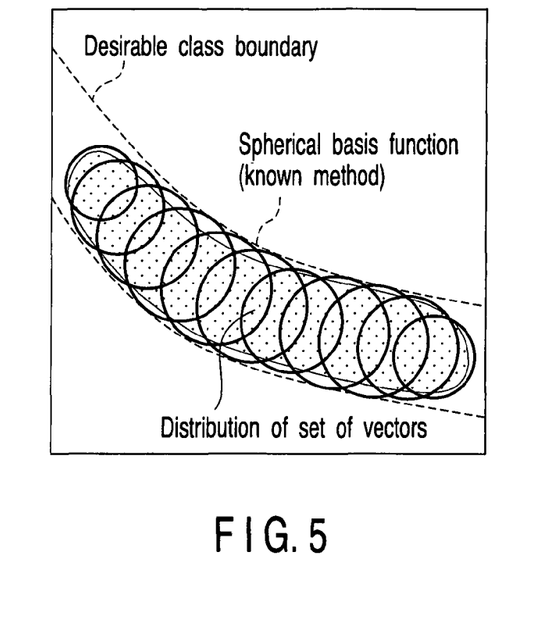
FIG. 5 is a schematic illustration of an approximation of a pattern distribution same as that of FIG. 4 made using conventional spherical basis functions.

FIG. 5 is a schematic illustration of an approximation of a pattern distribution same as that of FIG. 4 made using conventional spherical basis functions. FIG. 5 schematically shows that the conventional basis function requires more basis vectors than this embodiment (which requires only three basis vectors).

Generally, when the pattern distribution is complex but locally continuous (linear in particular) if viewed locally, it is possible to reduce the number of basis vectors by the interpolation potential of basis functions of the present invention. A basis function according to this embodiment is equivalent to a conventional spherical basis function in the worst case where interpolation cannot contribute to an approximation of a pattern distribution.

Figure 6:
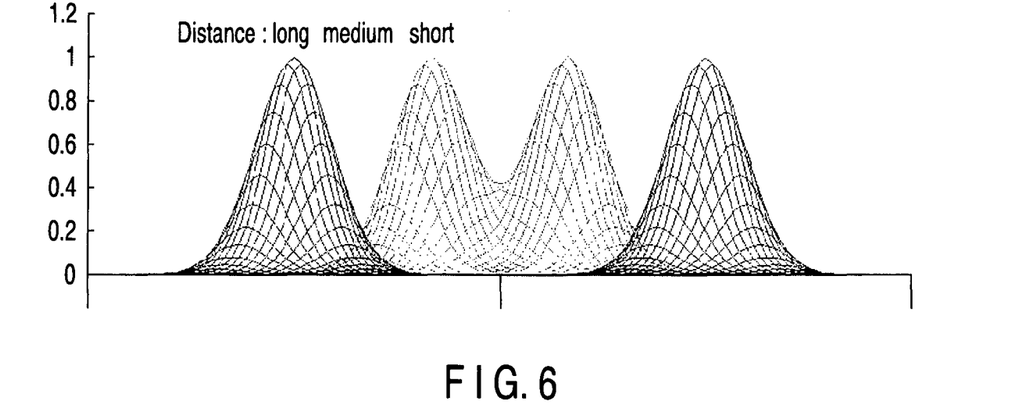
FIG. 6 is a schematic illustration of basis functions when the number of obtained samples is small, shown as an example.
Figure 7:
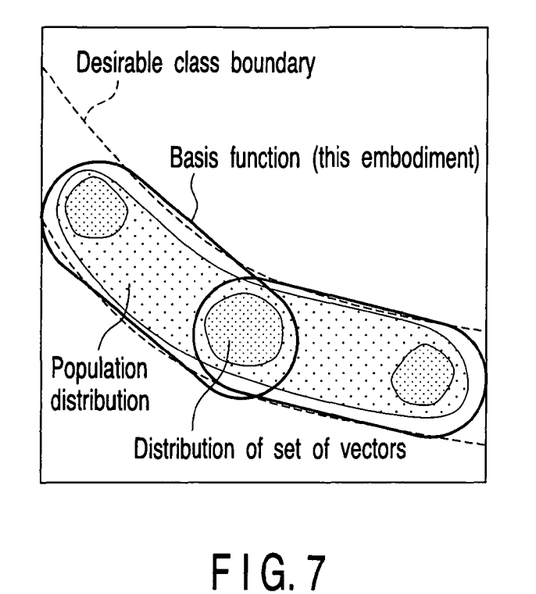
FIG. 7 is a schematic illustration of an approximation of a pattern distribution when the number of obtained samples is small, shown as an example.

Additionally, if the obtained samples are few, the approximation using basis functions does not become more complex than the population distribution but is very close to the latter. FIG. 6 is a schematic illustration of basis functions of this embodiment when the number of obtained samples is small and FIG. 7 is a schematic illustration of an approximation of a pattern distribution when the number of obtained samples is small. Basis functions of this embodiment have a means that local fluctuations of the input pattern are predicted according to the mathematical model for interpolation of basis vectors.

Figure 8:
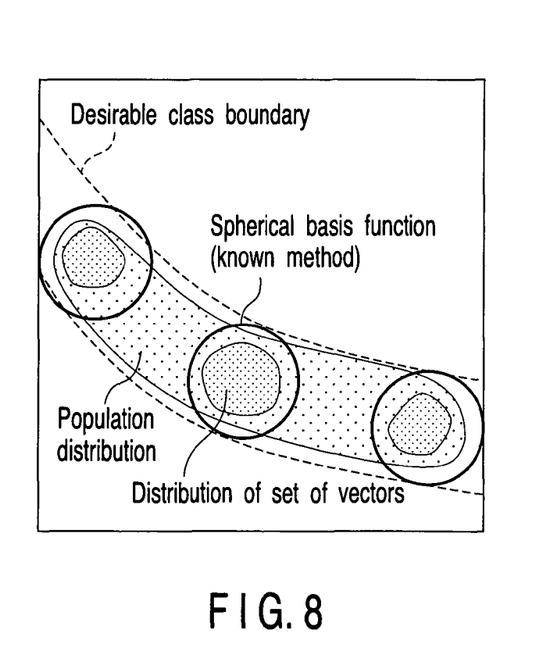
FIG. 8 is a schematic illustration of an approximation of the pattern distribution same as FIG. 7 made using conventional spherical basis functions, shown as an example.

FIG. 8 is a schematic illustration of an approximation of the pattern distribution same as FIG. 7 made using conventional spherical basis functions. FIG. 8 schematically illustrates that conventional spherical basis functions are located only around the obtained small number of samples to give rise to an approximation that considerably differs from the population distribution.

Generally, the fluctuations of a pattern observed from the real world are locally continuous, it is possible to more accurately approximate a population distribution from fewer samples due to the interpolation potential of basis functions of the present invention.

Second Embodiment

The present invention is by no means limited to the above-described first embodiment and can be embodied in various different ways independently from the above-described first embodiment so long as directional (not symmetric in all directions) basis functions are defined between two basis vectors. For example, basis functions as defined by the formula below are proposed for the second embodiment.

$$o'_{ij}(x) = \exp[-\|x - h_{ij}\|^2 \|\xi_i - \xi_j\|^2 / 2\sigma_{ij}^2]$$

where x represents the vectors that correspond to an input pattern and $h_{ij}$ represents the feet of the perpendiculars to the line segment connecting the i-th and j-th basis vectors from x, while $\xi_i$ and $\xi_j$ respectively represent the i-th and j-th basis vectors and $\sigma_{ij}$ represents the standard deviation of the basis functions defined between the i-th and j-th basis vectors.

The basis vectors are characterized by a cylindrical profile having the line segment connecting two basis vectors as core and extending in directions perpendicular to it. In the above formula, $h_{ij}$ is actually expressed by a formula using x, $\xi_i$ and $\xi_j$ so that the number of parameters is the same as in the first embodiment. The second embodiment is characterized in that, unlike the first embodiment, two basis vectors are connected by a constant value that corresponds to the distance between them.

Third Embodiment

The third embodiment relates to learning for parameters. Basis functions of the present invention have four parameters including $W_{ij}$, $\xi_i$, $\xi_j$ and $\sigma_{ij}$. If the distribution of the pattern to be handled is known, the parameters can be defined according to the distribution. However, the distribution of a pattern obtained from the real world is generally unknown.

Figure 9:
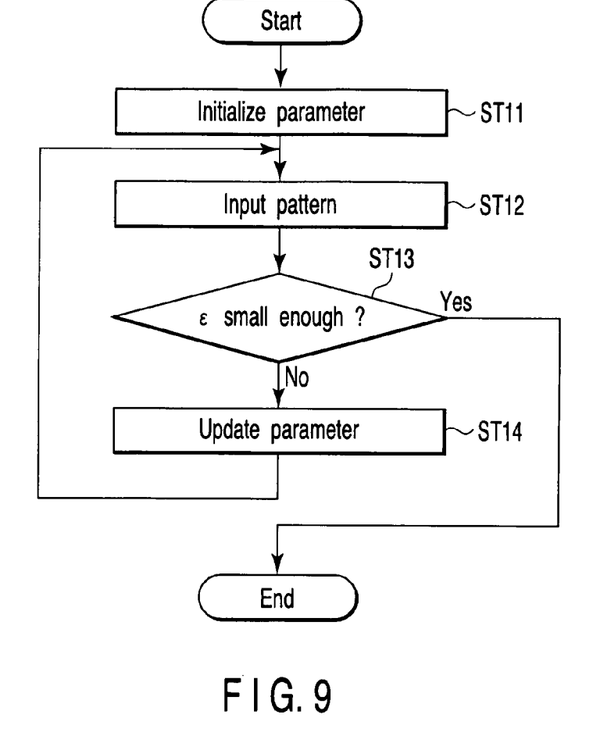
FIG. 9 is a flowchart illustrating a method of defining parameters by learning samples.

Thus, this embodiment proposes a technique of defining the parameters by learning samples. FIG. 9 is a flowchart illustrating a method of defining parameters by learning samples. Referring to FIG. 9, firstly the parameters are initialized by using appropriate values (ST11). Then, the parameters are updated (ST12 through ST14) for the obtained samples according to $$w'_{1ij} = w_{1ij} - \alpha[\partial \epsilon(x, y)/\partial w_{1ij}]$$

$$\xi'_i = \xi_i - \alpha[\partial \epsilon(x, y)/\partial \xi_i]$$

$$\xi'_j = \xi_j - \alpha[\partial \epsilon(x, y)/\partial \xi_j]$$

$$\sigma'_{ij} = \sigma_{ij} - \alpha[\partial \epsilon(x, y)/\partial \sigma_{ij}]$$

where $\epsilon(x, y)$ is the learning error and expressed by the formula below, using $y_c$ as a teaching signal (desirable value).

$$\epsilon(x, y) = (y_c - y(x))^2/2$$

where $\alpha$ is a learning constant, which is a positive value. The parameters are updated sequentially in this way and the learning session is ended when $\epsilon(x, y)$ shows a sufficiently small value (or when the number of learning sessions exceeds a predetermined number). The learning for parameters can be realized independently from the pattern recognition process of the first and second embodiments.

As pointed out above, with a pattern recognition method adapted to approximate the distribution of a set of vectors and the class boundary in a vector space based on basis functions, it is possible to approximate the distribution of a set of vectors and a class boundary with fewer basis vectors by defining directional basis functions (not symmetric in all directions) between two basis vectors and performing the approximation based on a linear combination thereof. Additionally, if the number of obtained samples is small, the approximation using basis functions does not become more complex than the population distribution but is very close to the latter unlike conventional basis functions.

Particularly, it is possible to approximate a set of vectors and a class boundary by modeling the relationship of strong interpolation and short distance, using basis functions that have peaks at the positions of the two basis vectors and show characteristics of connecting the two peaks by a non-linear curved surface whose dimensions correspond to the distance between them.

It is also possible to approximate a set of vectors and a class boundary by modeling the relationship of strong interpolation and short distance, using basis functions that have peaks at the positions of the two basis vectors and are characterized by the cylindrical profile having the line segment connecting two basis vectors as core and extending in directions perpendicular to it.

Furthermore, it is possible to define parameters by sequentially updating the parameters according to an error minimal standard, while inputting samples, even when the distribution of the pattern to be handled is unknown.

The processing sequences described above for the embodiments may be written as computer programs (codes) and stored in a computer-readable storage medium (e.g., a magnetic disk, an optical disk or a semiconductor memory) and any of the computer program may be read out and executed by means of a computer (processor) when necessary. Any of such computer programs can be distributed by transmitting it from a computer to another computer by way of a transmission medium.

Figure 10:
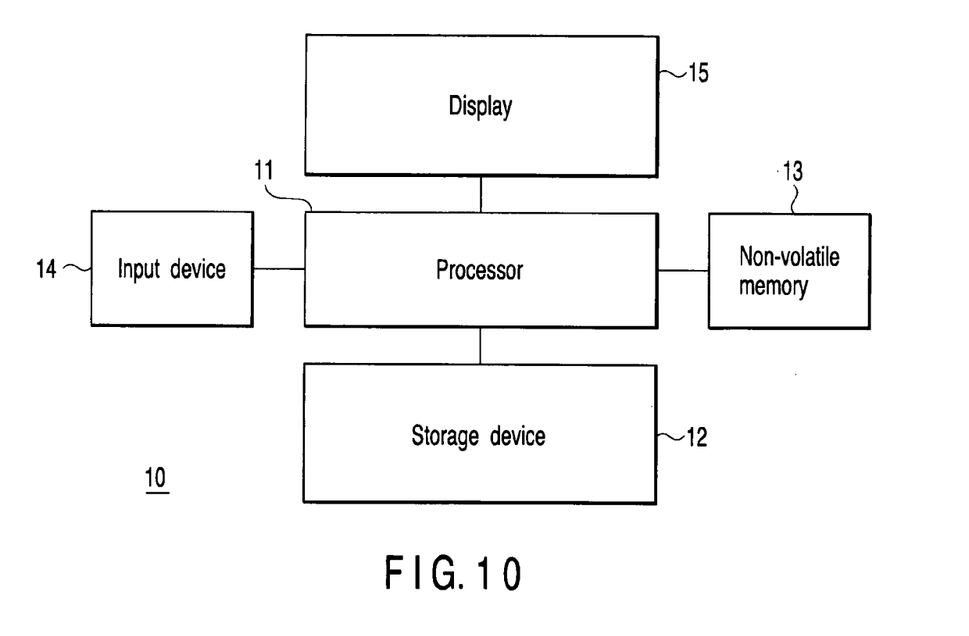
FIG. 10 is a schematic block diagram of hardware, showing the configuration thereof as an example.

Any of the computer programs containing the processing sequences may be executed by an information processing apparatus (computer) 11 having hardware resources as shown in FIG. 10. The processor (CPU or the like) 10 shown in FIG. 10 can execute the computer program loaded in a volatile memory (RAM or the like) 13 from a storage device (hard disk or the like) 12, display various pieces of information (the results of the processing operation) on a display 15 according to the operation at an input device (mouse, keyboard or the like) 14 and/or store them in the storage device 12.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern recognition method applied to an information processing apparatus that executes a pattern recognition process by approximating distribution of a set of vectors and a class boundary in a vector space based on basis functions, the method comprising:

inputting, to the information processing apparatus, a pattern as a string of pixel values of a digital image;

defining directional basis functions between two basis vectors using vectors corresponding to the input pattern;

performing the approximation using a linear combination of the directional basis functions; and displaying a result of the approximation on a display device associated with the information processing apparatus or storing the result of the approximation in a storage device associated with the information processing apparatus, wherein the approximation is performed using basis functions having peaks on the line segment connecting the two basis vectors and a profile formed by using the peaks as core, extending in directions perpendicular to it and having dimensions corresponding to the distance between them.

2. The method according to claim 1, wherein the approximation is performed using basis functions having peaks at the positions of the two basis vectors and connecting them by a non-linear curved surface whose dimensions correspond to the distance between them.

3. The method according to claim 1, wherein the profile formed by using the peaks as core, comprises a cylindrical profile.

4. The method according to claim 1, wherein the parameters of the basis functions are sequentially updated according to an error minimal standard, while inputting samples.

* * * * *